United States Patent
Bihani et al.

(10) Patent No.: US 11,636,273 B2
(45) Date of Patent: Apr. 25, 2023

(54) MACHINE-ASSISTED TRANSLATION FOR SUBTITLE LOCALIZATION

(71) Applicant: NETFLIX, INC., Los Gatos, CA (US)

(72) Inventors: Ballav Bihani, Fremont, CA (US); Matthew James Rickard, San Rafael, CA (US); Marianna Semeniakin, San Jose, CA (US); Ranjith Kumar Shetty, San Jose, CA (US); Allison Filemyr Smith, Los Angeles, CA (US); Patrick Brendon Pearson, Santa Clarita, CA (US); Sameer Shah, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 480 days.

(21) Appl. No.: 16/442,403

(22) Filed: Jun. 14, 2019

(65) Prior Publication Data
US 2020/0394271 A1    Dec. 17, 2020

(51) Int. Cl.
*G06F 40/58*    (2020.01)
*G10L 15/26*    (2006.01)

(52) U.S. Cl.
CPC .............. *G06F 40/58* (2020.01); *G10L 15/26* (2013.01)

(58) Field of Classification Search
CPC .... G06F 40/211; G06F 40/253; G06F 40/268; G06F 40/284; G06F 40/30; G06F 40/58; G06F 40/44; G06F 40/45; G06F 40/47
See application file for complete search history.

(56) References Cited

U.S. PATENT DOCUMENTS

| | | | | |
|---|---|---|---|---|
| 9,946,712 | B2 * | 4/2018 | Shen | H04N 21/4884 |
| 10,025,776 | B1 * | 7/2018 | Sjoberg | G06F 40/51 |
| 10,971,168 | B2 * | 4/2021 | Kwatra | G10L 17/04 |
| 2006/0074690 | A1 * | 4/2006 | Xu | G10L 21/06 704/276 |
| 2008/0301562 | A1 * | 12/2008 | Berger | G06F 16/958 715/733 |
| 2009/0083026 | A1 * | 3/2009 | Morsy | G06F 16/3337 704/9 |
| 2011/0077933 | A1 * | 3/2011 | Miyamoto | G10L 15/26 704/2 |

(Continued)

OTHER PUBLICATIONS

International Search Report for application No. PCT/US2020/037263 dated Sep. 28, 2020.

*Primary Examiner* — Lamont M Spooner
(74) *Attorney, Agent, or Firm* — Artegis Law Group, LLP

(57) ABSTRACT

One embodiment of the present disclosure sets forth a technique for generating translation suggestions. The technique includes receiving a sequence of source-language subtitle events associated with a content item, where each source-language subtitle event includes a different textual string representing a corresponding portion of the content item, generating a unit of translatable text based on a textual string included in at least one source-language subtitle event from the sequence, translating, via software executing on a machine, the unit of translatable text into target-language text, generating, based on the target-language text, at least one target-language subtitle event associated with a portion of the content item corresponding to the at least one source-language subtitle event, and generating, for display, a subtitle presentation template that includes the at least one target-language subtitle event.

18 Claims, 11 Drawing Sheets

(56) References Cited

U.S. PATENT DOCUMENTS

| | | | |
|---|---|---|---|
| 2012/0010869 A1* | 1/2012 | McCarley | G06F 40/44 704/3 |
| 2012/0265518 A1* | 10/2012 | Lauder | G06F 40/51 704/3 |
| 2012/0275761 A1* | 11/2012 | Li | H04N 9/80 386/239 |
| 2013/0103381 A1* | 4/2013 | Assche | G06F 40/47 704/2 |
| 2014/0068687 A1* | 3/2014 | Greenberg | H04N 21/234336 725/93 |
| 2014/0099076 A1* | 4/2014 | Li | H04N 5/92 386/244 |
| 2014/0201631 A1* | 7/2014 | Pornprasitsakul | G11B 27/031 715/716 |
| 2016/0133154 A1* | 5/2016 | Cortes | G09B 5/065 434/157 |
| 2016/0162478 A1* | 6/2016 | Blassin | G06Q 10/06311 706/12 |
| 2016/0170973 A1* | 6/2016 | Zhang | G06Q 50/01 704/3 |
| 2018/0027300 A1* | 1/2018 | Tsukagoshi | G06F 40/35 725/32 |
| 2019/0129946 A1 | 5/2019 | de Vrieze et al. | |
| 2019/0132372 A1* | 5/2019 | Litsyn | H04L 67/12 |
| 2019/0215580 A1* | 7/2019 | Parthasarathi | H04N 21/854 |
| 2020/0053409 A1* | 2/2020 | Abed | H04N 21/23418 |
| 2020/0098351 A1* | 3/2020 | Feinstein | G10L 15/02 |
| 2020/0098352 A1* | 3/2020 | Feinstein | G06N 5/022 |
| 2020/0160845 A1* | 5/2020 | Lavilla | G10L 15/08 |
| 2020/0211565 A1* | 7/2020 | Dubinsky | H04N 21/234336 |
| 2021/0233427 A1* | 7/2021 | Pesta | G06F 40/40 |

* cited by examiner

| Time | 220 | 230 |
|---|---|---|
| 0:03:46 | ⋮ | ⋮ |
| 0:03:54 | Something is coming.<br>Something hungry for blood. | |
| 0:03:56 | 228<br>A shadow grows on the wall behind,... | |
| 0:03:58 | 229<br>...swallowing you in darkness. | |
| 0:04:01 | 222 -It is almost here.<br>-What is it? | |
| 0:04:09 | 223<br>What if it's the Demogorgon? | |
| 0:04:15 | 224 Oh, Jeez, we're so screwed<br>if it's the Demogorgon. | |
| 0:04:19 | 225<br>It's not the Demogorgon. | |
| 0:04:30 | 226 An army of troglodytes<br>charge into the chamber! | |
| | ⋮ | ⋮ |

FIG. 2

| Time | 220 | 230 |
|---|---|---|
| 0:03:46 | ⋮ | ⋮ 330 |
|  | Something is coming.<br>Something hungry for blood. | Algo se acerca. Algo sediento<br>de sangre. |
| 0:03:54 | 228<br>A shadow grows on the wall behind,... | Una sombra crece en el<br>muro de atrás... |
| 0:03:56 | 229<br>...swallowing you in darkness. | ...y los sumerge en la oscuridad. |
| 0:03:58 | 222 -It is almost here.<br>-What is it? | -Ya casi está aquí<br>-¿Qué es? |
| 0:04:01 | 223<br>What if it's the Demogorgon? | ¿Y si es el Demogorgon? |
| 0:04:09 | 224 Oh, Jeez, we're so screwed<br>if it's the Demogorgon. | Cielos, si es el Demogoron,<br>estamos fritos. |
| 0:04:15 | 225<br>It's not the Demogorgon. | 330    No es él. |
| 0:04:19 | 226 An army of troglodytes<br>charge into the chamber! | ¡Un ejército de trogloditas irrumpió<br>en la recámara! |
| 0:04:30 | ⋮ | ⋮ 330 |

FIG. 3

MACHINE-ASSISTED TRANSLATION FOR SUBTITLE LOCALIZATION

BACKGROUND

Technical Field

The present disclosure relates generally to computer science and, more specifically, to machine-assisted translation for subtitle localization

Description of the Related Art

Text localization is the process of translating and otherwise adapting written content to a language or dialect specific to a country or region. Traditionally, text in a source language is translated into a target language manually, i.e., by a human translator reading a passage of source-language text, and, based on that translator's knowledge of the source language and the target language, generating target-language text of substantially similar meaning. However, manual translation is typically a time-consuming, error-prone, and long cycle-time process that is difficult to scale efficiently. Consequently, various computer-based techniques have been developed for automated translating of text, such as machine translation.

In practice, machine translation algorithms are generally unable to accurately translate idioms, accommodate the differences in linguistic typology that are invariably present between any two languages, or translate complex sentence structures. There are many applications in which even a small error in translation can have a serious negative impact on the utility and/or quality of the software, document, or service that includes the incorrectly translated text, such as software menus, video content subtitles, customer service communications, and the like. Thus, both manual translation and conventional machine translation techniques are inadequate for generating large volumes of accurately translated textual content.

As the foregoing illustrates, what is needed in the art are more effective approaches to translating textual content.

SUMMARY OF THE DISCLOSURE

One embodiment of the present disclosure sets forth a technique for translating subtitles for streaming video content. The technique includes receiving a sequence of source-language subtitle events associated with a content item, wherein each source-language subtitle event includes a different textual string representing a corresponding portion of the content item; generating a unit of translatable text based on a textual string included in at least one of the source-language subtitle events and representing at least one portion of the content item; translating the unit of translatable text into target-language text using a translation software application; generating, based on the target-language text, at least one target-language subtitle event associated with the at least one portion of the content item; and generating, for display, a subtitle presentation template that includes the at least one target-language subtitle event.

At least one advantage of the disclosed techniques is that high-quality subtitle translation suggestions can be generated for a subtitle event via an automated process, even when a subtitle event is only a fraction of a complete logical sentence.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a schematic illustration of a portion of a source-language subtitle template, according to various embodiments;

FIG. 3 is a schematic illustration of a portion of a target-language subtitle template, according to various embodiments;

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Overview

The manual translation process for localizing subtitles for streaming content is labor-intensive and costly. Because of the large amount of streaming content available and the large number of languages into which subtitles are generated, scaling of the localization process is important. In that regard, techniques which minimize manual translation and leverage previously translated textual content are of particular benefit.

In subtitled video content, translated text corresponding to dialogue in the video content is presented in a series of subtitle events. Depending on the specific dialogue, each subtitle event can include a partial sentence, a complete sentence, or multiple sentences or utterances. According to various embodiments, high-quality translation suggestions for each subtitle event in a streaming content item are generated via one or more automated approaches, even when a subtitle event is only a fraction of a complete logical sentence. Prior to translation by the automated approaches, the text to be translated is organized into logical sentences, either by combining the text from multiple subtitle events or by separating the text from a single subtitle event into multiple logical sentences. Because the translation suggestions generated via the automated approaches are based on a translation of a complete logical sentence in the source language, the accuracy of each translation suggestion is more accurate than when each subtitle event is translated separately by an automated approach. In some embodiments, multiple translation suggestions are provided for a particular subtitle event, where each translation suggestion is generated by a different automated approach. As a result, the quality of suggestions available to the human translator is further improved, which reduces time spent by the human translator editing a lower-quality translation suggestion and improves the efficiency of the subtitle localization process.

Advantageously, high-quality subtitle translation suggestions can be generated for a subtitle event via an automated process, even when a subtitle event is only a fraction of a complete logical sentence. Consequently, the editing effort needed to translate subtitles for an item of streaming content is greatly reduced. In addition, any edits performed by human translators are captured as feedback for a machine-learning model that ranks and selects translation suggestions that are the most likely to be an accurate translation. As a result, the ranking and selection process is continuously improved.

System Overview

Figure 1:
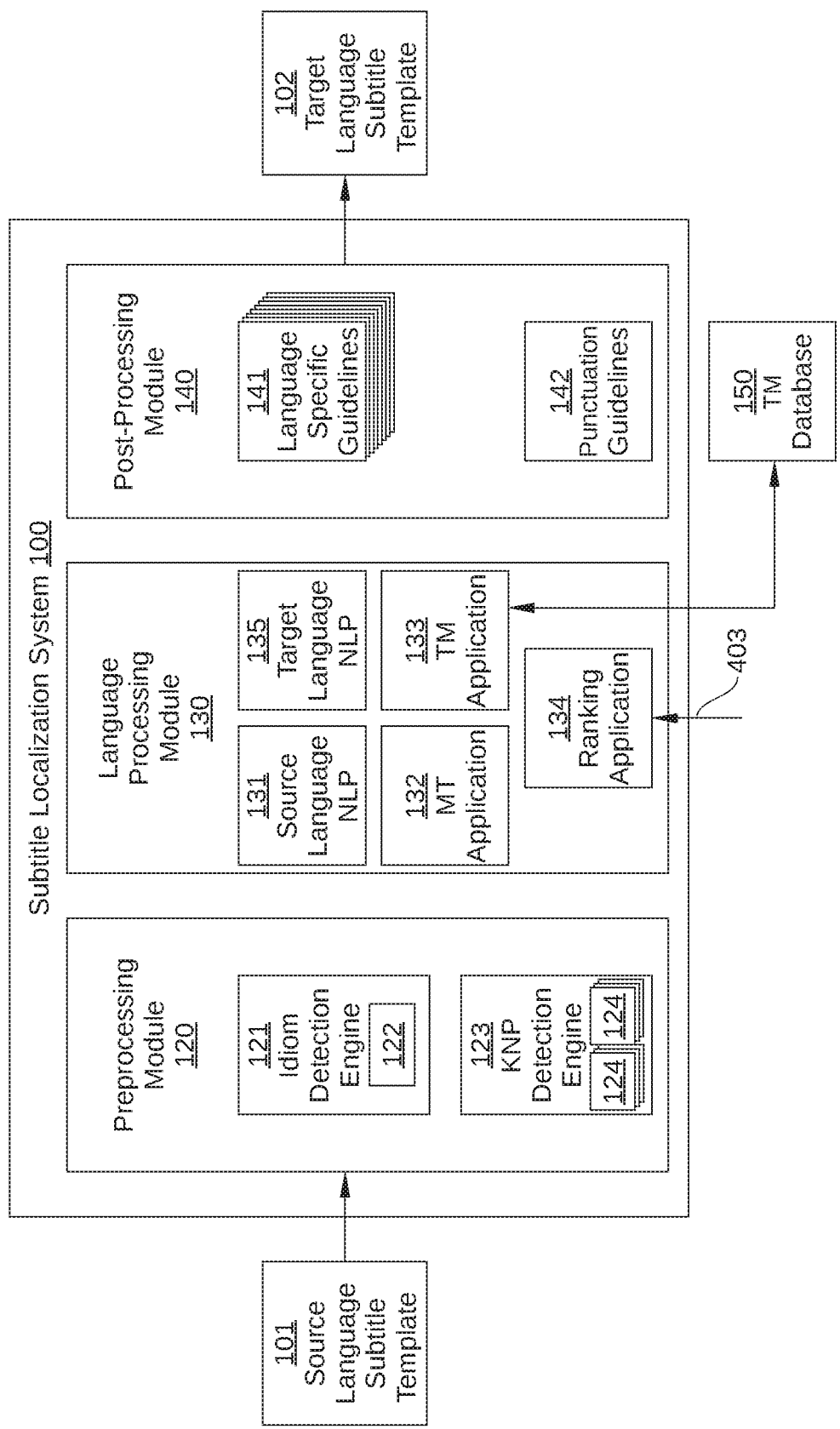
FIG. 1 illustrates a subtitle localization system configured to implement one or more aspects of various embodiments.

FIG. 1 illustrates a subtitle localization system 100 configured to implement one or more aspects of the present disclosure. Subtitle localization system 100 is configured to generate a target-language subtitle template 102 that facilitates final translation of subtitles in a target language for an item of streaming content by a human translator. Subtitle localization system 100 generate target-language subtitle template 102 by updating a source-language subtitle template 101 with translation suggestions for each source-language subtitle event, where the translation suggestions are based on complete logical sentences in the source language. To that end, subtitle localization system 100 is configured to generate one or more logical sentences in the source-language from a sequence of source-language subtitle events, translate the one or more logical sentences into corresponding logical sentences in the target language, and then combine, separate, or otherwise organize the logical sentences in the target language into suitable target-language subtitle events. As shown, subtitle localization system 100 includes a preprocessing module 120, a language processing module 130, and a post-processing module 140.

Source-language subtitle template 101 is configured to facilitate human translation of the subtitles for a particular item of streaming content, hereinafter referred to as the "content item." The content item can be any type of streaming video content, such as a movie, an episode of a television program, a sporting event, and the like. One embodiment of source-language subtitle template 101 is illustrated in FIG. 2.

FIG. 2 is a schematic illustration of a portion of source-language subtitle template 101, according to various embodiments of the present disclosure. In the embodiment illustrated in FIG. 2, source-language subtitle template 101 includes a series of timecodes 210, a sequence of subtitle events 220, and a corresponding sequence of translation fields 230. Each subtitle event 220 includes a textual string of source language text, e.g., English, corresponding to dialogue for a different segment of the content item. In some instances, the text included in a subtitle event 220 can be a complete logical sentence, and in other instances a partial sentence. The term "sentence," as used herein, is defined as a set of one or more words or utterances that is complete in itself. In some instances, a sentence conveys a statement, question, exclamation, or command, and typically, but not exclusively, includes a subject and a predicate. In some instances, a sentence can further include a main clause and one or more subordinate clauses. In the context of dialogue subtitles, which corresponds to spoken language, a sentence as defined herein can sometimes include no more than a portion of a statement, question, exclamation, or command.

The quantity of text included in each subtitle event 220 (e.g., the number of words and/or characters) generally varies based on the duration of the time interval associated with the subtitle event 220 and the quantity of dialogue spoken during the subtitle event 220. In some instances, the text included in a subtitle event 220 is a complete sentence, as illustrated in subtitle events 222-226. In other instances, due to the limited screen space available for displaying subtitle text and the speed at which dialogue is sometimes spoken during the time interval associated with a particular subtitle event 220, in the text included in a subtitle event 220 is only a portion of a complete sentence. In the case where a given subtitle event includes only a portion of a complete sentence, the remaining portion of the sentence is included in a subsequent subtitle event 220, as illustrated in subtitle events 228 and 229.

As shown, each subtitle event 220 is arranged chronologically and is associated with a unique start timecode included in timecodes 210 and a unique end timecode included in timecodes 210. The start timecode indicates a specific time at which the text associated with the subtitle event 220 first appears during playback of the content item and the end timecode indicates a specific time at which such text no longer appears during playback of the content item. In some embodiments, the start timecode for one subtitle event 220 is equivalent to the end timecode of the immediately preceding subtitle event 220. For example, in the embodiment illustrated in FIG. 2, subtitle event 222 is associated with an end timecode 211 that is equivalent to a start timecode 212 of a following subtitle event 223. In other embodiments, some or all subtitle events 220 have start timecode that is a different time than the end timecode of the immediately preceding subtitle event 220. Thus, in such embodiments, each subtitle event 220 can have a dedicated start timecode and end timecode. Further, in such embodiments, there can be a time gap between the end timecode of one subtitle event 220 and the start timecode of an immediately following subtitle event 220.

In source-language subtitle template 101, translation fields 230 are blank, since no suggested translations in a particular target language have yet been generated for the text of subtitle events 220. By contrast, in target-language subtitle template 102, some or all of translation fields 230 include translated text, as described below in conjunction with FIG. 3.

FIG. 3 is a schematic illustration of a portion of target-language subtitle template 102, according to various embodiments of the present disclosure. Target-language subtitle template 102 is generated by subtitle localization system 100, as described herein. Target-language subtitle template 102 is substantially similar to source-language subtitle template 101, but also includes translation suggestions 330 generated by subtitle localization system 100 as shown. In the embodiment illustrated in FIG. 3, source-language subtitle template 101 includes a single translation suggestion 330 for each subtitle event 220. In other embodiments, target-language subtitle template 102 includes multiple translation suggestions for each subtitle event 220. For example, in embodiments in which multiple automated approaches are employed to generate translation suggestions 330, a single translation field 230 can include one translation suggestion 330 generated by each of the automated approaches.

In the embodiment illustrated in FIG. 3, a human translator performs editing operations in translation fields 230. Alternatively, in some embodiments, target-language subtitle template 102 can further include a separate group of fields for performing editing operations on a selected suggestion and/or for entering manually translated text when no translation suggestion is available. In such embodiments, text entered into such manual fields is employed as the text for a particular subtitle event 220.

Returning to FIG. 1, preprocessing module 120 is a software application configured to perform one or more preprocessing operations on the source-language text included in subtitle events 220. The preprocessing operations facilitate subsequent language processing performed by language processing module 130, and can include idiom detection, key name or phrase (KNP) detection and replacement, removal of music lyrics, and the like. In the embodiment illustrated in FIG. 1, preprocessing module 120 includes an idiom detection engine 121 and a KNP detection engine 123.

Idiom detection engine 121 is configured to search the text included in source-language subtitle template 101 for target-language idioms. In some embodiments, idiom detection engine 121 compares text strings included in source-language subtitle template 101 to idioms stored in an idiom database 122. Alternatively or additionally, in some embodiments, idiom detection engine 121 compares such text strings to idioms tracked in one or more remote databases (not shown), such as an Internet-based database that is frequently revised with modern slang terminology. In either case, upon detection of idiomatic text, idiom detection engine 121 replaces the idiomatic text with equivalent non-idiomatic target-language text, thereby preventing the literal translation of the idiom during subsequent language processing by language processing module 130.

KNP detection engine 123 is configured to search the text included in source-language subtitle template 101 for key name and phrases (KNPs), such as proper names, character nicknames, location names, organization names, fictional words or names, and the like. Once detected, a KNP is flagged to prevent being literally translated in subsequent language processing by language processing module 130. Instead, each KNP is either carried over unchanged to the appropriate translation field 230 of target-language subtitle template 102, or is replaced in that translation field 230 with a suitable language-specific alternative from a content-specific glossary 124.

In some embodiments, the content-specific glossaries 124 reside locally (as shown), and in other embodiments, the content-specific glossaries 124 reside in one or more remote computing systems or databases. Idiom detection engine 121 compares text strings included in source-language subtitle template 101 to the KNPs that reside in a content-specific glossary 124 and makes the appropriate substitution.

In some embodiments, for each content item for which a target-language subtitle template 102 is being generated, KNP detection engine 123 employs a different content-specific glossary 124. For example, a particular movie or television series has a different content-specific glossary 124 associated therewith. Alternatively or additionally, in some embodiments, each content-specific glossary 124 includes language-specific alternatives for each KNP included therein. Thus, in such embodiments, different text is used to replace a KNP depending on the target language.

Alternatively or additionally, in some embodiments, preprocessing module 120 performs other preprocessing operations on the source-language text included in subtitle events 220, such as removing lyrics, closed-captioning text, and other superfluous text included in source-language subtitle template 101.

Language processing module 130 is a software application configured to perform one or more language processing operations on the source-language text included in subtitle events 220. More specifically, language processing module 130 is configured to split, combine, or otherwise organize a sequence of source-language subtitle events into one or more units of translatable text (such as a complete logical sentence) in the source-language, translate the one or more units of translatable text into corresponding units of translatable text in the target language, and then combine, split, or otherwise organize the units of translatable text in the target language into suitable target-language subtitle events. Generally, a unit of translatable text is a collection of sequential text that is translated together as a whole, such as a complete logical sentence, a partially spoken sentence that is cut-off or interrupted in the course of dialogue within a content item, or any other stand-alone utterance that has meaning independent from preceding and/or subsequent text. As shown, language processing module 130 includes one or more of a source language natural language processing (NLP) application 131, a machine translation (MT) application 132, a translation memory (TM) application 133, a ranking application 134, and a target language NLP application 135.

Source language NLP application 131 applies one or more NLP techniques for identifying sentence boundaries and organizing a sequence of source-language subtitle events 220 from source-language subtitle template 101 into one or more units of translatable text in the source-language, such as complete logical sentences. Thus, in some instances, the text of multiple subtitle events 220 is combined into a single logical sentence or other unit of translatable text in the source-language, while in other instances, the text of a single subtitle event 220 is split into multiple logical sentences or other units of translatable text in the source-language.

MT application 132 is a machine-translation software application configured to translate text from the source language of source-language subtitle template 101 into the target language of target-language subtitle template 102. MT application 132 can include one or more conventional MT approaches, including rule-based MT (e.g., transfer-based MT, interlingual MT, and/or dictionary-based MT), statistical MT, example-based MT, hybrid MT, and/or neural MT, among others. It is noted that MT approaches generally generate more accurate results when a complete logical sentence is being translated. Thus, according to embodiments described herein, the target-language text translated from logical sentences generated by source language NLP application 131 can be significantly more accurate than target-language text translated piecemeal on a subtitle-event by subtitle-event basis.

TM application 133 is a translation memory software application configured to translate text from the source language of source-language subtitle template 101 into the target language of target-language subtitle template 102. TM application 133 performs such translations based on "translation units" stored in a TM database 150, which are source-language text segments that are each paired with a corresponding translation in the target language. The text segments can be sentences, paragraphs or sentence-like units, for example, headings, titles or list elements. In the embodiment illustrated in FIG. 1, TM database 150 is remote from subtitle localization system 100, but in other embodiments, TM database 150 is included in subtitle localization system 100.

Ranking application 134 is a software application that is configured to rank target-language text generated by language processing module 130. Specifically, ranking application 134 determines an estimated translation accuracy of the target-language text generated by MT application 132 and by TM application 133 for a particular source-language logical sentence. Thus, for a particular source-language logical sentence generated by source language NLP application 131, ranking application 134 determines which is more likely to be the most accurate.

In some embodiments, ranking application 134 makes such a determination based on one or more heuristic parameters associated with the source-language logical sentence, the corresponding target-language sentence generated by MT application 132, and/or the corresponding target-language sentence generated by TM application 133. For example, in some embodiments, ranking application 134 determines that source-language logical sentences shorter than a threshold word count are more likely to be accurately translated by TM application 133 than by MT application 132. Alternatively or additionally, in some embodiments, ranking application 134 determines that exact matches recognized by TM application 133 are more likely to be accurately translated by translations generated by MT application 132.

In some embodiments, ranking application 134 determines which of multiple translations of a source-language logical sentence is more likely to be accurate based on a machine-learning (ML) process. In such embodiments, the ML process can receive translation feedback 103 as training data. Translation feedback 103 includes manual translation parameters of previously performed translations of target-language text included in translation fields 230 of a target-language subtitle template 102. One example of a manual translation parameter is an edit distance between the target-language text included in a translation suggestion 330 and corresponding final target-language text entered in a translation field 230 by a human translator when the translation suggestion 330 is edited. Another example of a manual translation parameter is whether a highest ranked translation in a translation field 230 is not selected by a human translator and a lower-ranked translation is instead selected and/or edited by the human translator. Other manual translation parameter can also be included in translation feedback 103.

Target language NLP application 135 applies one or more NLP techniques for organizing target-language logical sentences into suitable target-language subtitle events. In some instances, target language NLP application 135 splits the text of a single target-language logical sentence into multiple target-language subtitle events 220, while in other instances, target language NLP application 135 combines multiple target-language logical sentences into a single subtitle event. The operations of source language NLP application 131 and target language NLP application 135 are described below in conjunction with FIG. 4.

Figure 4:
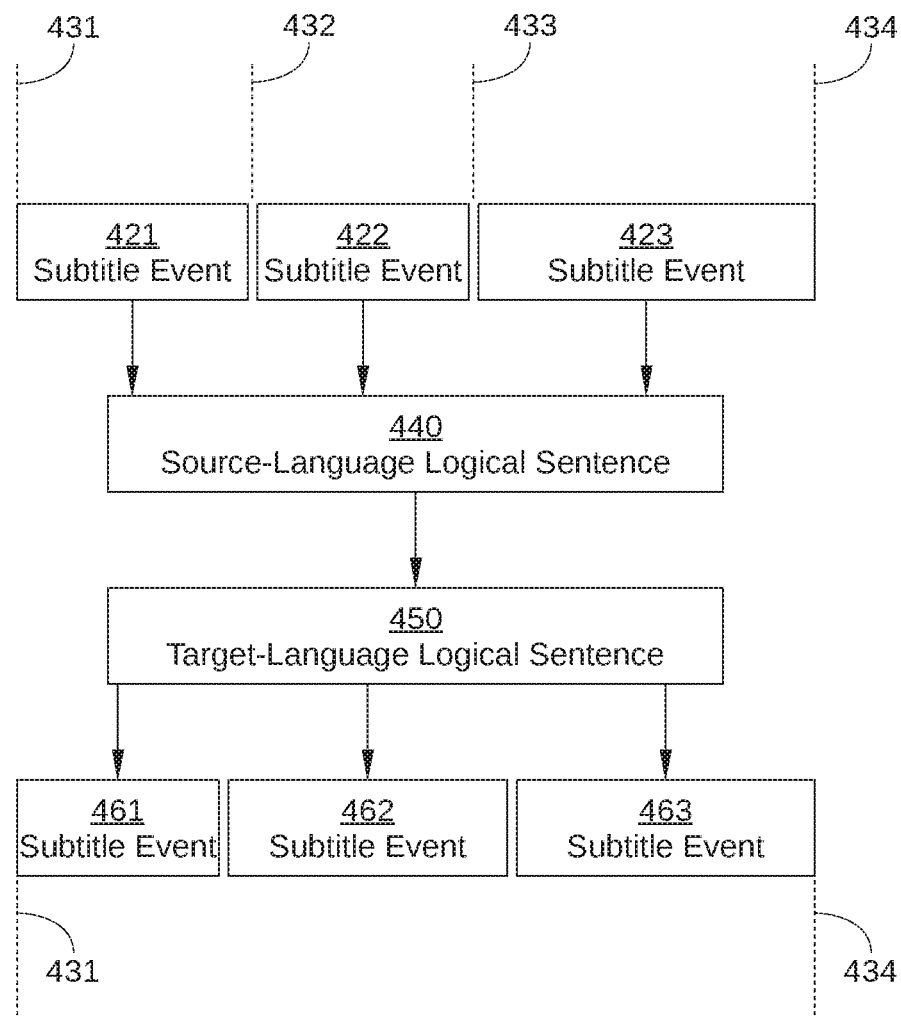
FIG. 4 schematically illustrates NLP operations performed on a series of subtitle events, according to various embodiments.

FIG. 4 schematically illustrates NLP operations performed on a series of subtitle events 421-423, according to various embodiments of the present disclosure. Subtitle events 421-423 make up a series of subtitle events that occur sequentially in a source-language subtitle template, such as source-language subtitle template 101 of FIG. 1. As such, each of subtitle events 421-423 includes a different textual string of source-language subtitle text. In addition, each of subtitle events 421-423 is associated with two of timecodes 431-434: subtitle event 421 begins at time code 431 and ends at timecode 432; subtitle event 422 begins at time code 432 and ends at timecode 433; and subtitle event 423 begins at time code 433 and ends at timecode 434. Typically, each of subtitle events 421-423 is associated with a time interval of a different duration.

In the embodiment illustrated in FIG. 4, the textual strings included in subtitle events 421-423 form a single source-language sentence or other unit of translatable text that is spoken during a time interval that approximately spans timecode 431 to about timecode 434. As such, source language NLP application 131 determines that the text associated with subtitle events 421-423 make up the single source-language sentence, based on NLP cues like punctuation, sentence structure, ML-generated punctuation, and the like. Consequently, source language NLP application 131 organizes the textual strings of subtitle events 421-423 into a source-language sentence 440, as shown.

In some embodiments, source language NLP application 131 determines that the text associated with subtitle events 421-423 is not to be combined or merged to form one or more logical sentences. For example, in such embodiments, source language NLP application 131 determines not to form one or more logical sentences from the text based on insufficient or nonexistent punctuation in the text, a lack of ML-generated punctuation for the text, detection of song lyrics in the text, and/or the inability of source language NLP application 131 to detect logical sentences from the text. In such embodiments, no translation of the text may be performed by language processing module 130, or language processing module 130 may translate the text associated with subtitle events 421-423 on a subtitle-event by subtitle-event basis. In the latter case, there is therefore an n:n correspondence between the total number of source-language subtitle events and the total number of corresponding target-language subtitle events generated by language processing module 130.

Language processing module 130 then translates source-language sentence 440 into a target-language sentence 450. Because source-language sentence 440 is a complete sentence or other unit of translatable text, MT application 132, TM application 133, and any other automated approaches employed in language processing module 130 are each more likely to generate an accurate translation than when the textual strings of each of subtitle events 421-423 is translated individually. In some embodiments, language processing module 130 translates source-language sentence 440 using multiple automated approaches, for example via MT application 132 and TM application 133. Thus, in such embodiments, multiple target-language sentences 450 may be generated for a single source-language sentence 440. For clarity, only one target-language sentence 450 is shown in FIG. 4. Once the multiple target-language sentences 450 are generated for the source-language sentence 440, ranking application 134 performs a ranking operation to determine which target-language sentence 450 is most likely to be the most accurate translation.

Target language NLP application 135 then splits, combines, or otherwise organizes the text of each target-language sentence 450 into a sequence of one or more target-language subtitle events 461-463. Various parameters can be employed for the separation of a target-language sentence 450 into multiple subtitle events and for the merging of multiple target-language sentences 450 into a single subtitle event. Examples of suitable parameters include the number of characters and/or words included in target-language sentence 450, the duration of the time intervals indicated by timecodes 431-434, and grammatical breaking points within target-language sentence 450, such as independent clauses, dependent clauses, certain punctuation, and the like.

In the embodiment illustrated in FIG. 4, target-language sentence 450 is separated into the same number of subtitle events as were merged to form source-language sentence 440, i.e., three subtitle events 461-463. In the embodiment, subtitle events 461-463 are disposed between timecode 431 and timecode 434, as shown. In other embodiments, target-language sentence 450 may be separated into more than three subtitle events or fewer than three subtitle events, but in each case, the subtitle events generated by target language NLP application 135 from target-language sentence 450 are included within the bounds of timecode 431 and timecode 434.

It is noted that, due to inherent differences in syntax and word length between the source language and the target language, there is not necessarily a one-to-one correspondence in the meaning of text in a source-language subtitle event and a corresponding target-language subtitle event. For example, the meaning of text included in subtitle event 421 is not necessarily equivalent to the meaning of text included in subtitle event 461. However, similar dialogue is presented in approximately the same timeframe, i.e., between timecode 431 and timecode 434. Further, in some instances there is not an n:n correspondence in the number of target-language subtitle events generated by language processing module 130 and the number of source-language subtitle events on which the target-language subtitle events are based. That is, for a particular timeframe, language processing module 130 is generally not constrained to generate the same number of target-language subtitle events as source-language subtitle events.

In the embodiment illustrated in FIG. 4, multiple subtitle events are merged into a single logical sentence to facilitate translation. In some embodiments, a single subtitle event is split into multiple logical sentences to facilitate translation. One such embodiment is illustrated in FIG. 5.

Figure 5:
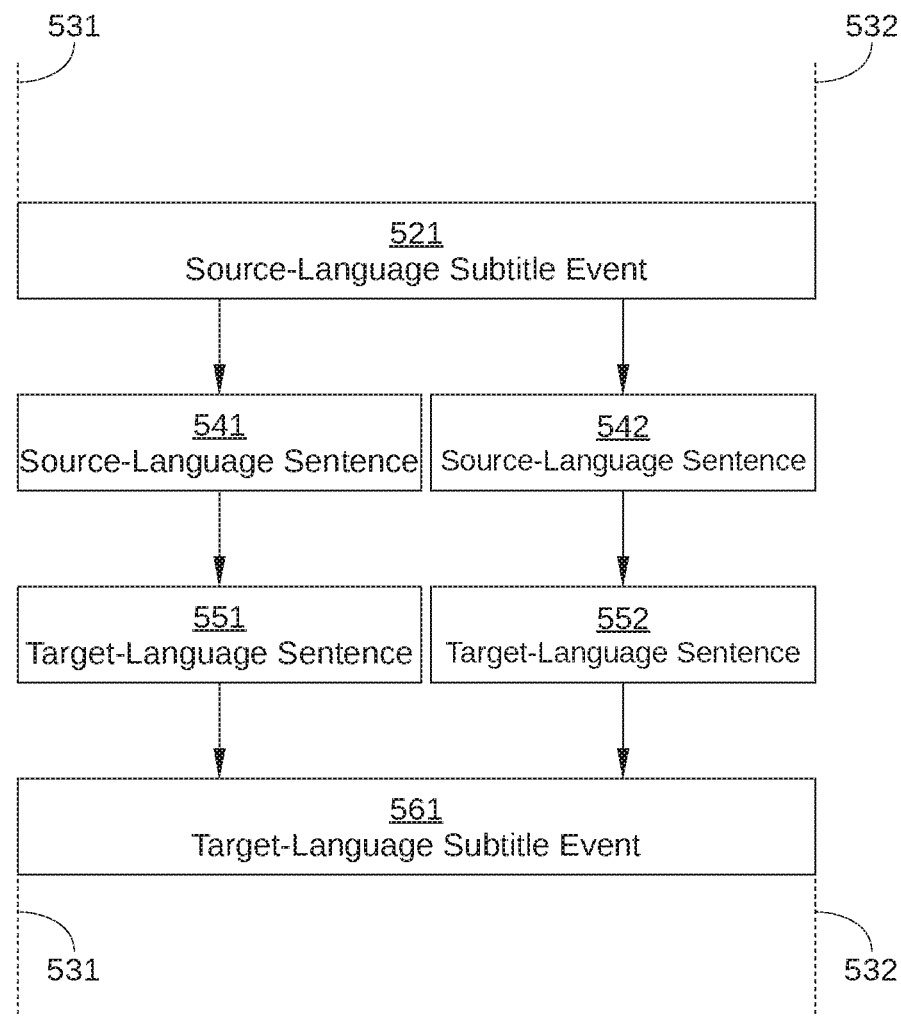
FIG. 5 schematically illustrates NLP operations performed on a single subtitle event, according to various embodiments.

FIG. 5 schematically illustrates NLP operations performed on a single source-language subtitle event 521, according to various embodiments of the present disclosure. Source-language subtitle event 521 is included in a source-language subtitle template, such as source-language subtitle template 101 of FIG. 1, and includes source-language subtitle text. As shown, source-language subtitle event 521 is associated with two timecodes 531 and 532. In contrast to the embodiment illustrated in FIG. 4, in FIG. 5 the textual strings included in source-language subtitle event 521 form multiple target-language sentences or other units of translatable text that is spoken during a time interval that approximately spans timecode 531 to about timecode 532. As such, source language NLP application 131 determines that the text associated with source-language subtitle event 521 makes up multiple source-language sentences, based on NLP cues like punctuation, sentence structure, and the like. Consequently, source language NLP application 131 organizes the textual strings of source-language subtitle event 521 into source-language sentence 541 and 542, as shown.

Language processing module 130 then translates source-language sentence 541 into a target-language sentence 551 and source-language sentence 542 into a target-language sentence 552. In some embodiments, language processing module 130 translates source-language sentences 541 and 542 using multiple automated approaches, for example via MT application 132 and TM application 133. Target language NLP application 135 then splits, combines, or otherwise organizes the text of target-language sentences 551 and 552 into a suitable sequence of one or more target-language subtitle events that approximately span timecode 531 to about timecode 532. In the embodiment illustrated in FIG. 5, target-language sentences 551 and 552 are combined into a single target-language subtitle event 561 that corresponds to source-language subtitle event 521.

In some instances, the number of words in the target-language sentences 551 and 552 is significantly different than the number of words in the source-language sentences 541 and 542. As a result, to be displayed appropriately during playback, the text for target language sentences 551 and 552 may require more subtitle events. In such instances, target-language sentences 551 and 552 can be combined into a different number of target-language subtitle events than the number of source-language subtitle events derived from source-language sentences 541 and 542.

Returning to FIG. 1, post-processing module 140 is a software application configured to perform one or more post-processing operations on the target-language text included in subtitle events 220. The post-processing operations enhance the presentation and/or clarity of the textual information generated by language processing module 130. For example, in some embodiments, post-processing module 140 implements one or more language-specific guidelines 141 in the text that is presented to viewers. Alternatively or additionally, post-processing module 140 implements one or more punctuation guidelines 142 in the text that is presented to viewers, such as the use of hyphens to indicate multiple speakers, italics to indicate off-screen speech or voice-overs, etc.

By way of illustration, subtitle localization system 100 is illustrated conceptually as a single entity in FIG. 1, however, in some embodiments, subtitle localization system 100 may be implemented as a distributed computing system across multiple computing devices. In a similar vein, preprocessing module 120, language processing module 130, and post-processing module 140 may each be distributed over multiple machines. Furthermore, the various functions of subtitle localization system 100 that are divided between preprocessing module 120, language processing module 130, and post-processing module 140 may be combined into a single application, or rearranged between multiple additional application, and are not limited to the configuration illustrated in FIG. 5.

Machine-Assisted Translation for Subtitle Localization

Figure 6:
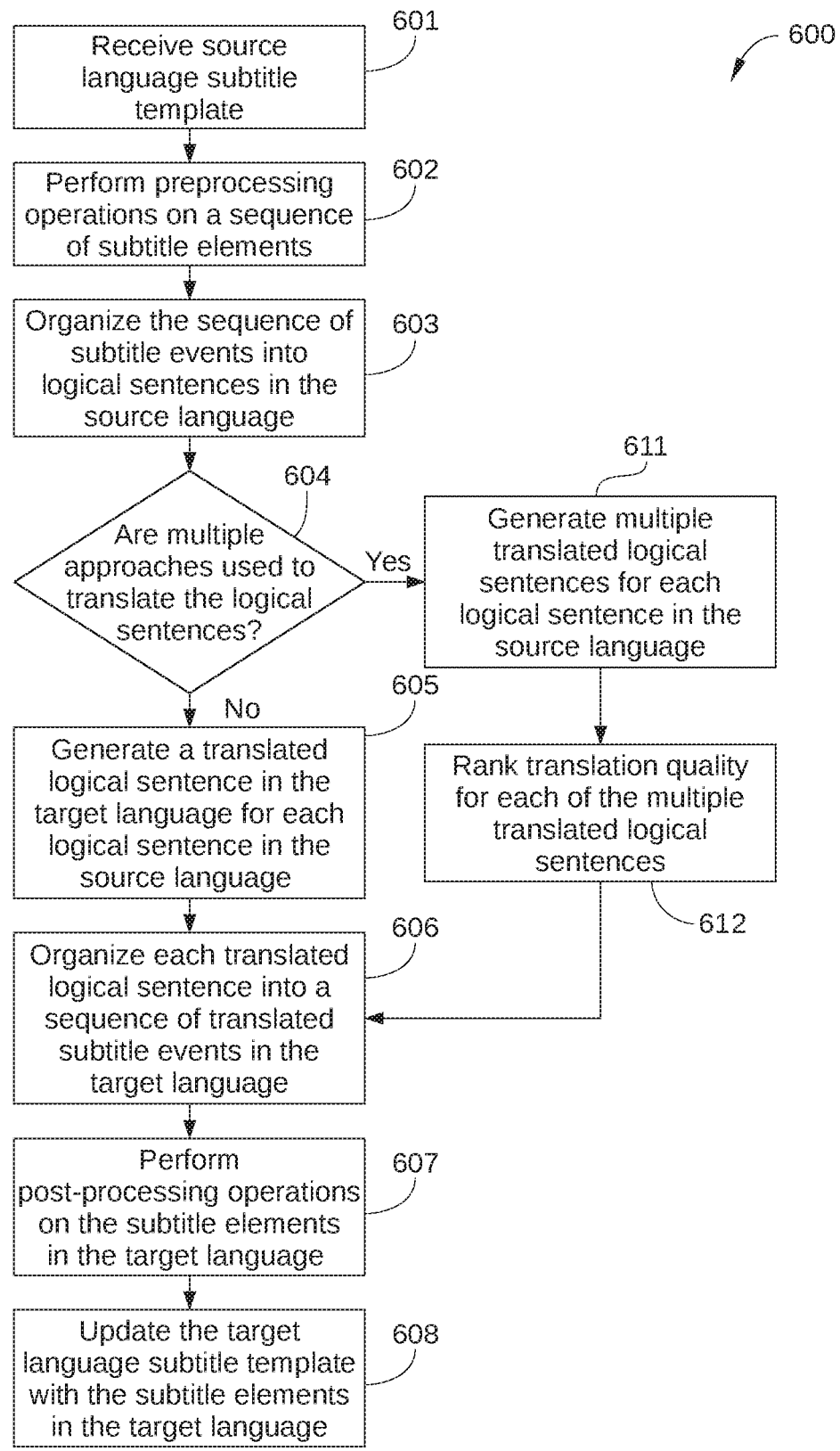
FIG. 6 sets forth a flowchart of method steps for generating translation suggestions for subtitle events, according to various embodiments.

FIG. 6 sets forth a flowchart of method steps for generating translation suggestions for subtitle events, according to various embodiments of the present disclosure. Although the method steps are described with respect to the systems of FIGS. 1-5, persons skilled in the art will understand that any system configured to perform the method steps, in any order, falls within the scope of the present disclosure.

As shown, a method 600 begins at step 601, in which subtitle localization system 100 receives source-language subtitle template 101 that includes a sequence of source-language subtitle events 220.

In step 602, preprocessing module 120 performs one or more preprocessing operations on textual strings included in the source-language subtitle events 220, such as idiom detection and translation and KNP detection.

In step 603, language processing module 130 generates units of translatable text (such as logical sentences or other complete utterances), for example by separating, combining, and/or otherwise organizing the textual strings of the sequence of source-language subtitle events 220.

In step 604, language processing module 130 determines whether multiple approaches are used to translate the units of translatable text generated in step 603. If yes, method 600 proceeds to step 611; If no, method 600 proceeds to step 605.

In step 605, language processing module 130 generates a translated logical sentence or other unit of translatable text for each unit of translatable text generated in step 603.

In step 606, language processing module 130 combines, separates, or otherwise organizes each unit of translatable text in the target language into one or more target-language subtitle events, for example as shown in FIG. 5 or 6.

In step 607, post-processing module 140 performs one or more post-processing operations on each of the target-language subtitle events generated in step 606.

In step 608, subtitle localization system 100 generates a target-language subtitle template 102. Generally, target-language subtitle template 102 includes the target-language subtitle events generated in step 606. The target-language textual strings included the target-language subtitle events can be displayed to a human interpreter as translation suggestions when the source-language subtitle events included in source-language subtitle template 101 are being translated by the human interpreter.

In step 611, language processing module 130 generates multiple translated logical sentence or other unit of translatable text for each unit of translatable text generated in step 603.

In step 612, ranking application 134 ranks the translation quality of each of the multiple translated logical sentences generated in step 603.

Streaming Platform

Figure 7:
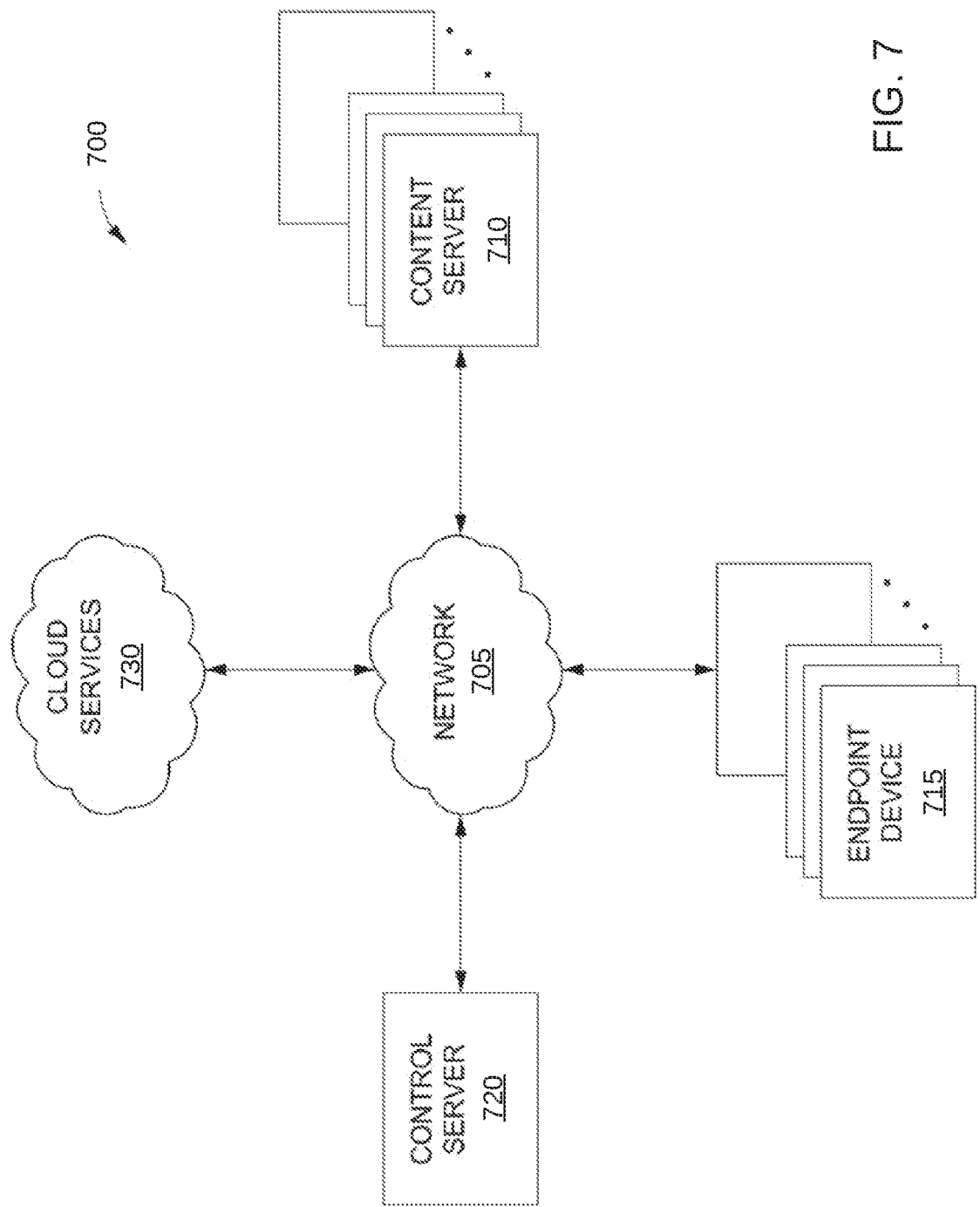
FIG. 7 illustrates a network infrastructure, according to various embodiments.

FIG. 7 illustrates a network infrastructure 700, according to various embodiments of the disclosure. As shown, the network infrastructure 700 includes content servers 710, control server 720, and endpoint devices 715, each of which are connected via a communications network 705. Network infrastructure 700 is configured to distribute content to content servers 710, and such content is then distributed on demand to endpoint devices 715.

Each endpoint device 715 communicates with one or more content servers 710 (also referred to as "caches" or "nodes") via the network 705 to download content, such as textual data, graphical data, audio data, video data, and other types of data. The downloadable content, also referred to herein as a "file," is then presented to a user of one or more endpoint devices 715. In various embodiments, the endpoint devices 715 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 710 may include a web-server, database, and server application 817 (shown in FIG. 8) configured to communicate with the control server 720 to determine the location and availability of various files that are tracked and managed by the control server 720. Each content server 710 may further communicate with cloud services 730 and one or more other content servers 710 in order "fill" each content server 710 with copies of various files. In addition, content servers 710 may respond to requests for files received from endpoint devices 715. The files may then be distributed from the content server 710 or via a broader content distribution network. In some embodiments, the content servers 710 enable users to authenticate (e.g., using a username and password) in order to access files stored on the content servers 710. Although only a single control server 720 is shown in FIG. 7, in various embodiments multiple control servers 720 may be implemented to track and manage files.

In various embodiments, the cloud services 730 may include an online storage service (e.g., Amazon® Simple Storage Service, Google® Cloud Storage, etc.) in which a catalog of files, including thousands or millions of files, is stored and accessed in order to fill the content servers 710. Cloud services 730 also may provide compute or other processing services. Although only a single cloud services 730 is shown in FIG. 7, in various embodiments multiple cloud services 730 may be implemented.

Figure 8:
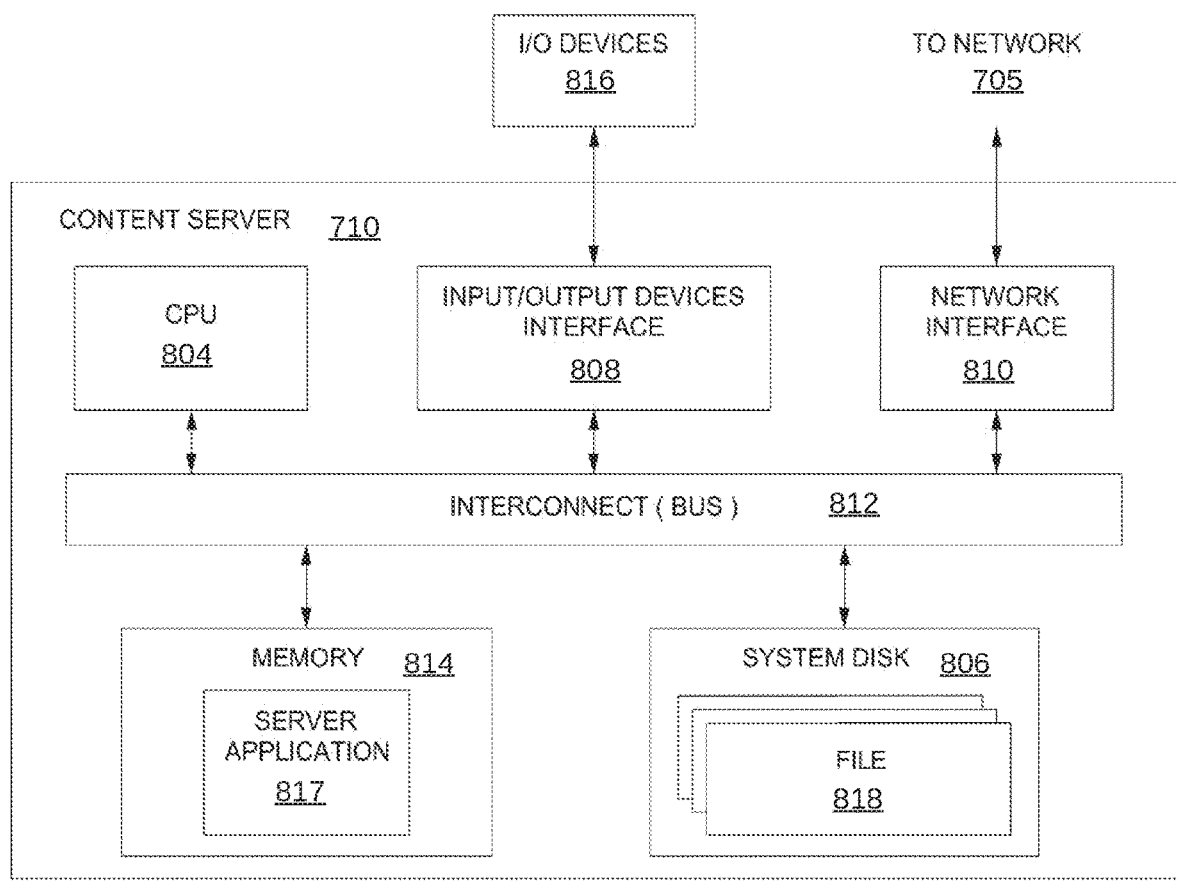
FIG. 8 is a more detailed illustration of the content server of FIG. 7, according to various embodiments.

FIG. 8 is a more detailed illustration of content server 710 of FIG. 7, according to various embodiments of the present disclosure. As shown, the content server 710 includes, without limitation, a central processing unit (CPU) 804, a system disk 806, an input/output (I/O) devices interface 808, a network interface 810, an interconnect 812, and a system memory 814.

The CPU 804 is configured to retrieve and execute programming instructions, such as server application 817, stored in the system memory 814. Similarly, the CPU 804 is configured to store application data (e.g., software libraries) and retrieve application data from the system memory 814. The interconnect 812 is configured to facilitate transmission of data, such as programming instructions and application data, between the CPU 804, the system disk 806, I/O devices interface 808, the network interface 810, and the system memory 814. The I/O devices interface 808 is configured to receive input data from I/O devices 816 and transmit the input data to the CPU 804 via the interconnect 812. For example, I/O devices 816 may include one or more buttons, a keyboard, a mouse, and/or other input devices. The I/O devices interface 808 is further configured to receive output data from the CPU 804 via the interconnect 812 and transmit the output data to the I/O devices 816.

The system disk 806 may include one or more hard disk drives, solid state storage devices, or similar storage devices. The system disk 806 is configured to store non-volatile data such as files 818 (e.g., audio files, video files, subtitles, application files, software libraries, etc.). The files 818 can then be retrieved by one or more endpoint devices 715 via the network 705. In some embodiments, the network interface 810 is configured to operate in compliance with the Ethernet standard.

The system memory 814 includes a server application 817 configured to service requests for files 818 received from endpoint device 715 and other content servers 710. When the server application 817 receives a request for a file 818, the server application 817 retrieves the corresponding file 818 from the system disk 806 and transmits the file 818 to an endpoint device 715 or a content server 710 via the network 705.

Figure 9:
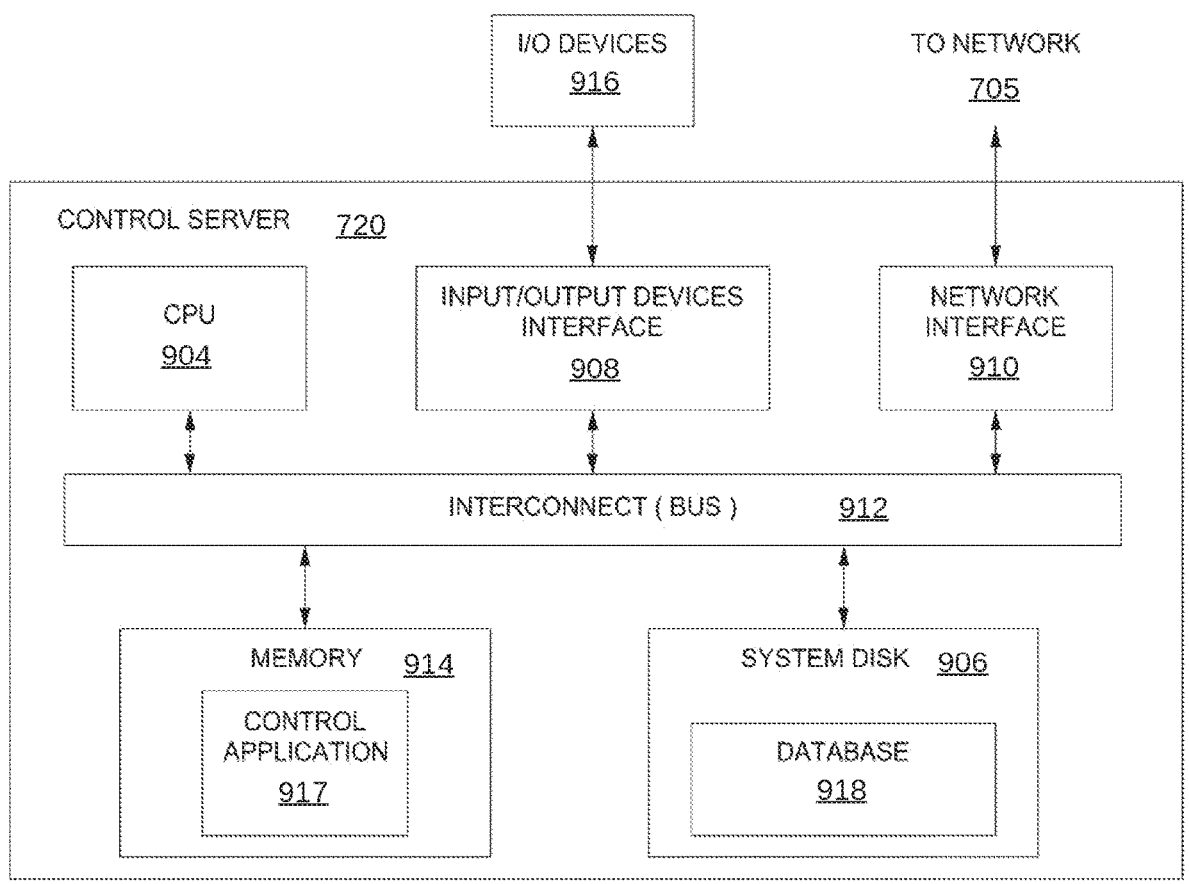
FIG. 9 is a more detailed illustration of the control server of FIG. 7, according to various embodiments.

FIG. 9 is a more detailed illustration of control server 720 of FIG. 7, according to various embodiments of the present disclosure. As shown, the control server 720 includes, without limitation, a central processing unit (CPU) 904, a system disk 906, an input/output (I/O) devices interface 908, a network interface 910, an interconnect 912, and a system memory 914.

The CPU 904 is configured to retrieve and execute programming instructions, such as control application 917, stored in the system memory 914. Similarly, the CPU 904 is configured to store application data (e.g., software libraries) and retrieve application data from the system memory 914 and a database 918 stored in the system disk 906. The interconnect 912 is configured to facilitate transmission of data between the CPU 904, the system disk 906, I/O devices interface 908, the network interface 910, and the system memory 914. The I/O devices interface 908 is configured to transmit input data and output data between the I/O devices 916 and the CPU 904 via the interconnect 912. The system disk 906 may include one or more hard disk drives, solid state storage devices, and the like. The system disk 806 is configured to store a database 918 of information associated with the content servers 710, the cloud services 730, and the files 818.

The system memory 914 includes a control application 917 configured to access information stored in the database 918 and process the information to determine the manner in which specific files 818 will be replicated across content servers 710 included in the network infrastructure 700. The control application 917 may further be configured to receive and analyze performance characteristics associated with one or more of the content servers 710 and/or endpoint devices 715.

Figure 10:
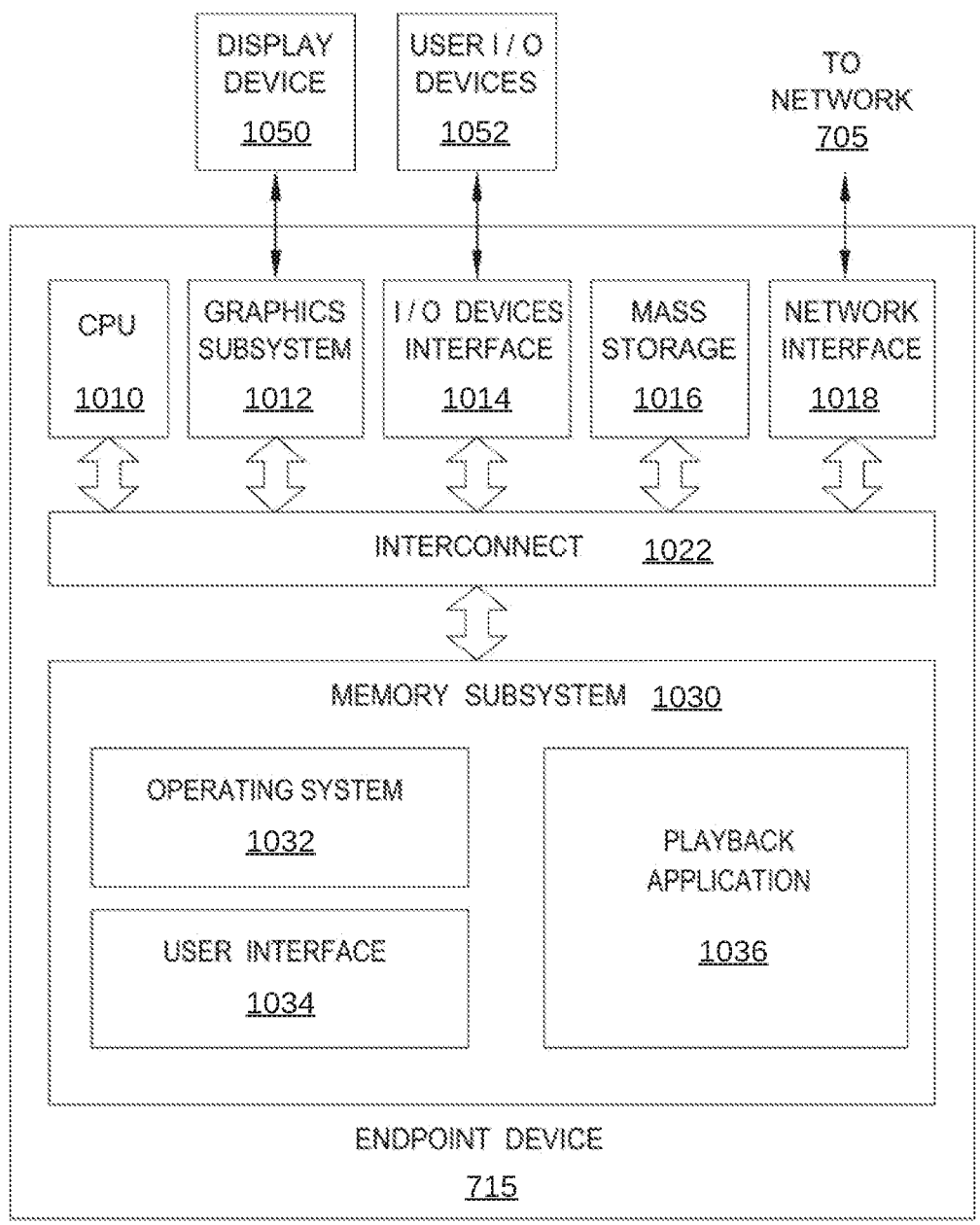
FIG. 10 is a more detailed illustration of the endpoint device of FIG. 7, according to various embodiments.

FIG. 10 is a more detailed illustration of the endpoint device 715 of FIG. 7, according to various embodiments of the present disclosure. As shown, the endpoint device 715 may include, without limitation, a CPU 1010, a graphics subsystem 1012, an I/O device interface 1014, a mass storage unit 1016, a network interface 1018, an interconnect 1022, and a memory subsystem 1030.

In some embodiments, the CPU 1010 is configured to retrieve and execute programming instructions stored in the memory subsystem 1030. Similarly, the CPU 1010 is configured to store and retrieve application data (e.g., software libraries) residing in the memory subsystem 1030. The interconnect 1022 is configured to facilitate transmission of data, such as programming instructions and application data, between the CPU 1010, graphics subsystem 1012, I/O devices interface 1014, mass storage 1016, network interface 1018, and memory subsystem 1030.

In some embodiments, the graphics subsystem 1012 is configured to generate frames of video data and transmit the frames of video data to display device 1050. In some embodiments, the graphics subsystem 1012 may be integrated into an integrated circuit, along with the CPU 1010. The display device 1050 may comprise any technically feasible means for generating an image for display. For example, the display device 1050 may be fabricated using liquid crystal display (LCD) technology, cathode-ray technology, and light-emitting diode (LED) display technology. An input/output (I/O) device interface 1014 is configured to receive input data from user I/O devices 1052 and transmit the input data to the CPU 1010 via the interconnect 1022. For example, user I/O devices 1052 may comprise one of more buttons, a keyboard, and a mouse or other pointing device. The I/O device interface 1014 also includes an audio output unit configured to generate an electrical audio output signal. User I/O devices 1052 includes a speaker configured to generate an acoustic output in response to the electrical audio output signal. In alternative embodiments, the display device 1050 may include the speaker. Examples of suitable devices known in the art that can display video frames and generate an acoustic output include televisions, smartphones, smartwatches, electronic tablets, and the like.

A mass storage unit 1016, such as a hard disk drive or flash memory storage drive, is configured to store nonvolatile data. A network interface 1018 is configured to transmit and receive packets of data via the network 705. In some embodiments, the network interface 1018 is configured to communicate using the well-known Ethernet standard. The network interface 1018 is coupled to the CPU 1010 via the interconnect 1022.

In some embodiments, the memory subsystem 1030 includes programming instructions and application data that comprise an operating system 1032, a user interface 1034, and a playback application 1036. The operating system 1032 performs system management functions such as managing hardware devices including the network interface 1018, mass storage unit 1016, I/O device interface 1014, and graphics subsystem 1012. The operating system 1032 also provides process and memory management models for the user interface 1034 and the playback application 1036. The user interface 1034, such as a window and object metaphor, provides a mechanism for user interaction with endpoint device 715. Persons skilled in the art will recognize the various operating systems and user interfaces that are well-known in the art and suitable for incorporation into the endpoint device 708.

In some embodiments, the playback application 1036 is configured to request and receive content from the content server 705 via the network interface 1018. Further, the playback application 1036 is configured to interpret the content and present the content via display device 1050 and/or user I/O devices 1052.

As described herein, various functions are performed by subtitle localization system 700. Such functions may be implemented as one or more applications executed by one or more computing devices associated with subtitle localization system 700. One such computing device is described below in conjunction with FIG. 8.

Figure 11:
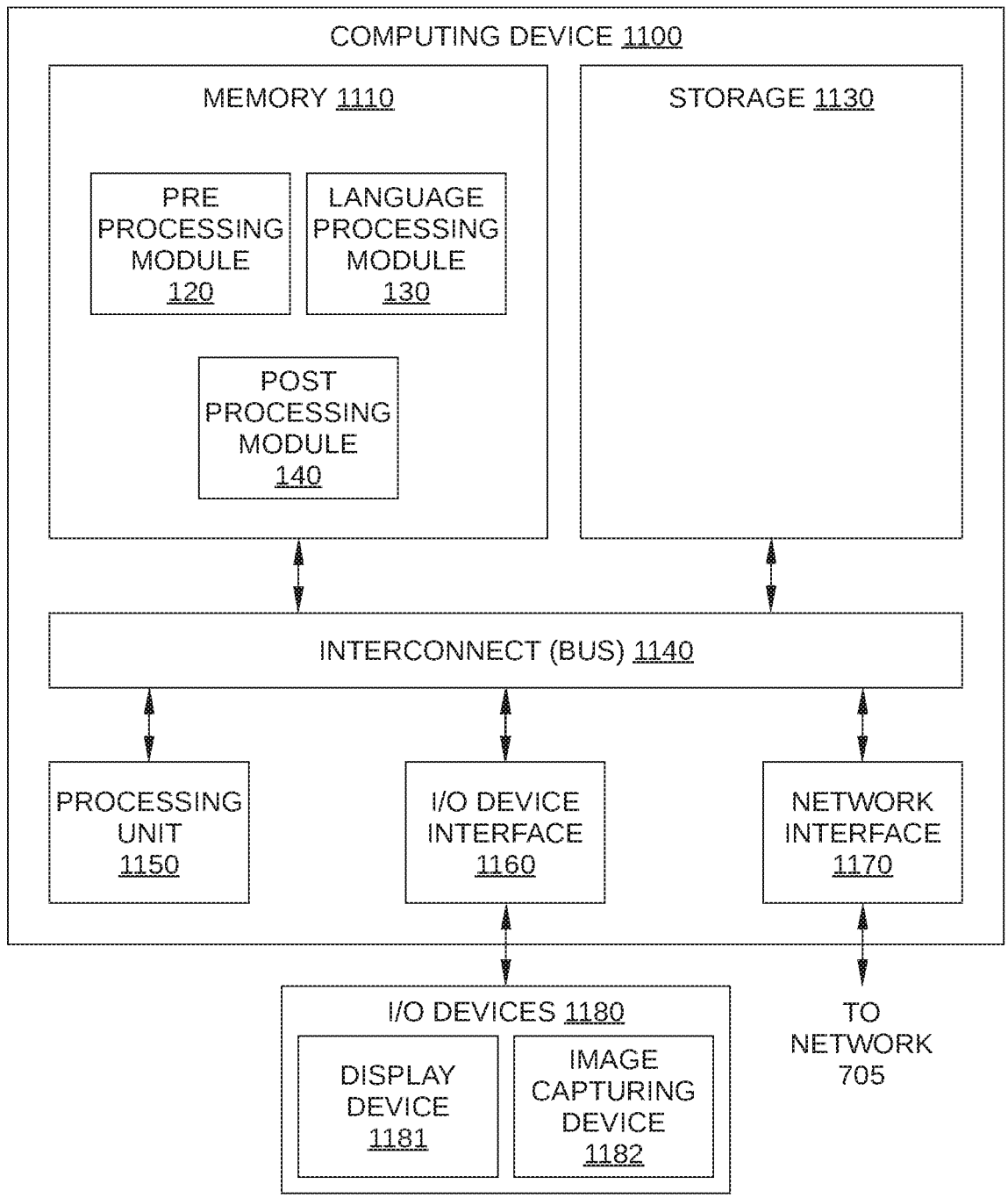
FIG. 11 is an illustration of a computing device configured to implement one or more functions of the subtitle localization system of FIG. 1, according to various embodiments.

FIG. 11 is an illustration of a computing device 1100 configured to implement one or more functions of the localization platform of FIG. 1, according to various embodiments. Computing device 1100 is configured to translate textual content and facilitate translation of textual content by executing one or more of preprocessing module 120, language processing module 130, and/or post-processing module 140, according to one or more embodiments of the present disclosure.

Computing device 1100 may be any type of device capable of executing application programs including, without limitation, instructions associated with preprocessing module 120, language processing module 130, and/or post-processing module 140. For example, and without limitation, computing device 1100 may be a laptop, a tablet, a smartphone, etc. In the embodiment illustrated in FIG. 11, computing device 1100 includes, without limitation, a processor 1110, input/output (I/O) devices 1120, and a memory 1130.

Processor 1110 may be implemented as a central processing unit (CPU), a graphics processing unit (GPU), an ASIC, an FPGA, any other type of processing unit, or a combination of different processing units. In general, processor 1110 may be any technically feasible hardware unit capable of processing data and/or executing software applications to facilitate execution of preprocessing module 120, language processing module 130, and/or post-processing module 140, as described herein. Among other things, and without limitation, processor 1110 may be configured to execute instructions associated with preprocessing module 120, language processing module 130, and/or post-processing module 140.

I/O devices 1120 may include input devices, output devices, and devices capable of both receiving input and providing output. Memory 1130 may include a memory module or a collection of memory modules. As shown, in some embodiments, some or all of preprocessing module 120, language processing module 130, and/or post-processing module 140 may reside in memory 1130 during operation.

Computing device 1100 may be implemented as a stand-alone chip, such as a microprocessor, or as part of a more comprehensive solution that is implemented as an application-specific integrated circuit (ASIC), a system-on-a-chip (SoC), and so forth. Generally, computing device 1100 may be configured to coordinate the overall operation of a computer-based system. In other embodiments, computing device 1100 may be coupled to, but separate from such a computer-based system. In such embodiments, the computer-based system may include a separate processor that transmits input to computing device 1100, such as digital images and/or digital videos, and receives output from computing device 1100. However, the embodiments disclosed herein contemplate any technically feasible system configured to implement preprocessing module 120, language processing module 130, and post-processing module 140, in any combination. In alternative embodiments, rather than being configured as a single machine, computing device 1100 may be configured as a distributed computing system, such as a cloud-computing system. Alternatively or additionally, in some embodiments, rather than being configured as one or more stand-alone machines, computing device 1100 may be associated with or included in one or more of content servers 710 and/or control servers 720 in FIG. 1. For example, and without limitation, the functionality of computing device 1100 may be incorporated into CPU 1104 of content server 710, shown in FIG. 11. In such embodiments, preprocessing module 120, language processing module 130, and/or post-processing module 140 may reside in one or more of content servers 110 and/or control servers 120 during operation.

In sum, high-quality translation suggestions for each subtitle event in a streaming content item are generated via one or more automated approaches, even when a subtitle event is only a fraction of a complete logical sentence. Prior to translation by the automated approaches, the text to be translated is organized into logical sentences, either by combining the text from multiple subtitle events or by separating the text from a single subtitle event into multiple logical sentences. Because the translation suggestions generated via the automated approaches are based on a translation of a complete logical sentence in the source language, the accuracy of each translation suggestion is more accurate than when each subtitle event is translated separately by an automated approach.

At least one advantage of the disclosed techniques is that high-quality subtitle translation suggestions can be generated for a subtitle event via an automated process, even when a subtitle event is only a fraction of a complete logical sentence. Consequently, the editing effort needed to translate subtitles for an item of streaming content is greatly reduced. In addition, any edits performed by human translators are captured as feedback for a machine-learning model that ranks and selects translation suggestions that are the most likely to be an accurate translation. As a result, the ranking and selection process is continuously improved.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

1. In some embodiments, a computer-implemented method for generating translation suggestions for subtitle events comprises: receiving a sequence of source-language subtitle events associated with a content item, wherein each source-language subtitle event includes a different textual string representing a corresponding portion of the content item; generating a unit of translatable text based on a textual string included in at least one source-language subtitle event from the sequence; translating, via software executing on a machine, the unit of translatable text into target-language text; generating, based on the target-language text, at least one target-language subtitle event associated with a portion of the content item corresponding to the at least one source-language subtitle event; and generating, for display, a subtitle presentation template that includes the at least one target-language subtitle event.

2. The computer-implemented method of clause 1, wherein generating the unit of translatable text comprises combining a textual string included in each of multiple subtitle events into a single unit of translatable text.

3. The computer-implemented method of clauses 1 or 2, wherein generating the unit of translatable text comprises separating the textual string into multiple units of translatable text.

4. The computer-implemented method of any of clauses 1-3, wherein the at least one source-language subtitle event includes no more than a single textual string.

5. The computer-implemented method of any of clauses 1-4, wherein translating the unit of translatable text into target-language text comprises: translating a first unit of translatable text based on a first textual string included in a first source-language subtitle event from the sequence into a first unit of target-language text; and translating a second unit of translatable text based on a second textual string included in a second source-language subtitle event from the sequence into a second unit of target-language text.

6. The computer-implemented method of any of clauses 1-5, wherein generating the at least one target-language subtitle event comprises combining the first unit of target-language text and the second unit of target-language text into a single target-language subtitle event.

7. The computer-implemented method of any of clauses 1-6, wherein generating the at least one target-language subtitle event comprises separating the target-language text into multiple target-language subtitle events.

8. The computer-implemented method of any of clauses 1-7, wherein generating the subtitle presentation template comprises temporally aligning the target-language text with the unit of translatable text.

9. The computer-implemented method of any of clauses 1-8, wherein temporally aligning the target-language text with the unit of translatable text comprises positioning in the subtitle presentation template a first target-language subtitle event that includes a portion of the target-language text to begin when a first source-language subtitle event that includes a portion of the unit of translatable text begins.

10. The computer-implemented method of any of clauses 1-9, wherein temporally aligning the target-language text with the unit of translatable text comprises positioning in the subtitle presentation template a last target-language subtitle event that includes a portion of the target-language text to end when a last source-language subtitle event that includes a portion of the unit of translatable text ends.

11. In some embodiments, a non-transitory computer-readable storage medium includes instructions that, when executed by one or more processors, configure the one or more processors to perform the steps of: receiving a sequence of source-language subtitle events associated with a content item, wherein each source-language subtitle event includes a different textual string representing a corresponding portion of the content item; generating a unit of translatable text based on a textual string included in at least one source-language subtitle event from the sequence; causing the unit of translatable text to be translated into machine translated text in a target language; generating, based on the machine translated text, at least one target-language subtitle event associated with a portion of the content item corresponding to the at least one source-language subtitle event; and generating, for display, a subtitle presentation template that includes the at least one target-language subtitle event.

12. The non-transitory computer-readable storage medium of clause 11, wherein causing the unit of translatable text to be translated comprises: causing the unit of translatable text to be translated into first target-language text with a machine translation application; and causing the unit of translatable text to be translated into second target-language text with a translation memory application.

13. The non-transitory computer-readable storage medium of clauses 11 or 12, further comprising instructions that, when executed by one or more processors, configure the one or more processors to perform the step of ranking a translation quality of the first target-language text and the second target-language text.

14. The non-transitory computer-readable storage medium of any of clauses 11-13, wherein ranking the translation quality of the first target-language text and the second target-language text comprises: determining a first translation quality of the first target-language text based on one or more heuristic parameters associated with the unit of translatable text; determining a second translation quality of the second target-language text based on the one or more heuristic parameters; and based on the first translation quality and the second translation quality, selecting one of the first target-language text or the second target-language text as a highest quality translation.

15. The non-transitory computer-readable storage medium of any of clauses 11-14, wherein ranking the translation quality of the first target-language text and the second target-language text comprises: determining a first translation quality of the first target-language text with a machine-learning model; determining a second translation quality of the second target-language text with the machine-learning model; and based on the first translation quality and the second translation quality, selecting one of the first target-language text and the second target-language text as a highest quality translation.

16. The non-transitory computer-readable storage medium of any of clauses 11-15, wherein generating the unit of translatable text comprises combining a textual string from each of multiple source-language subtitle events from the sequence into a single unit of translatable text.

17. The non-transitory computer-readable storage medium of any of clauses 11-16, wherein generating the unit of translatable text comprises separating the textual string into multiple units of translatable text.

18. A system, comprising: a memory that stores instructions; and a processor that is coupled to the memory and, when executing the instructions, is configured to: receive a sequence of source-language subtitle events associated with a content item, wherein each source-language subtitle event includes a different textual string representing a corresponding portion of the content item; generate a unit of translatable text based on a textual string included in at least one source-language subtitle event from the sequence; translate, via software, the unit of translatable text into target-language text; generate, based on the target-language text, at least one target-language subtitle event associated with a portion of the content item corresponding to the at least one source-language subtitle event; and generate, for display, a subtitle presentation template that includes the at least one target-language subtitle event.

19. The system of clause 18, wherein the processor translates the unit of translatable text by: causing the unit of translatable text to be translated into first target-language text with a machine translation application; causing the unit of translatable text to be translated into second target-language text with a translation memory application; determining a first translation quality of the first target-language text with a machine-learning model; determining a second translation quality of the second target-language text with the machine-learning model; and based on the first translation quality and the second translation quality, selecting one of the first target-language text and the second target-language text as a highest quality translation.

20. The system of clauses 18 or 19, wherein the subtitle template temporally arranges the sequence of source-language subtitle events with respect to a series of time codes that each indicate a specific playback time in the content item.

Any and all combinations of any of the claim elements recited in any of the claims and/or any elements described in this application, in any fashion, fall within the contemplated scope of the present embodiments and protection.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope of the disclosure as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method for generating translation suggestions for subtitle events, the method comprising:
   receiving a sequence of source-language subtitle events associated with a content item, wherein each source-language subtitle event includes a different textual string representing a corresponding portion of the content item;
   generating a first unit of translatable text by combining a first textual string included in a first source-language subtitle event included in the sequence of source-language subtitle events and a second textual string included in a second source-language subtitle event included in the sequence of source-language subtitle events, wherein the second source-language subtitle event is different from the first source-language subtitle event;
   translating, via software executing on a machine, the first unit of translatable text into target-language text;
   generating, based on the target-language text, at least one target-language subtitle event associated with a portion of the content item corresponding to the first source-language subtitle event and the second source-language subtitle event; and
   generating, for display, a subtitle presentation template that includes the at least one target-language subtitle event.

2. The computer-implemented method of claim 1, further comprising generating a second unit of translatable text by separating a third textual string included in a third source-language subtitle event included in the sequence of source-language subtitle events into multiple units of translatable text.

3. The computer-implemented method of claim 2, wherein the third source-language subtitle event includes no more than a single textual string.

4. The computer-implemented method of claim 1, wherein translating the first unit of translatable text into target-language text comprises:
   translating a first portion of the first unit of translatable text based on the first textual string included in the first source-language subtitle event from the sequence into a first unit of target-language text; and
   translating a second portion of the first unit of translatable text based on the second textual string included in the second source-language subtitle event from the sequence into a second unit of target-language text.

5. The computer-implemented method of claim 4, wherein generating the at least one target-language subtitle event comprises combining the first unit of target-language text and the second unit of target-language text into a single target-language subtitle event.

6. The computer-implemented method of claim 1, wherein generating the at least one target-language subtitle event comprises separating the target-language text into multiple target-language subtitle events.

7. The computer-implemented method of claim 1, wherein generating the subtitle presentation template comprises temporally aligning the target-language text with the first unit of translatable text.

8. The computer-implemented method of claim 7, wherein temporally aligning the target-language text with the first unit of translatable text comprises positioning in the subtitle presentation template a first target-language subtitle event that includes a portion of the target-language text to begin when the first source-language subtitle event begins.

9. The computer-implemented method of claim 7, wherein temporally aligning the target-language text with the first unit of translatable text comprises positioning in the subtitle presentation template a last target-language subtitle event that includes a portion of the target-language text to end when the second source-language subtitle event ends.

10. A non-transitory computer-readable storage medium includes instructions that, when executed by one or more processors, configure the one or more processors to perform the steps of:

receiving a sequence of source-language subtitle events associated with a content item, wherein each source-language subtitle event includes a different textual string representing a corresponding portion of the content item;

generating a first unit of translatable text by combining a first textual string included in a first source-language subtitle event included in the sequence of source-language subtitle events and a second textual string included in a second source-language subtitle event included in the sequence of source-language subtitle events, wherein the second source-language subtitle event is different from the first source-language subtitle event;

causing the first unit of translatable text to be translated into machine translated text in a target language;

generating, based on the machine translated text, at least one target-language subtitle event associated with a portion of the content item corresponding to the first source-language subtitle event and the second source-language subtitle event; and generating, for display, a subtitle presentation template that includes the at least one target-language subtitle event.

11. The non-transitory computer-readable storage medium of claim 10, wherein causing the first unit of translatable text to be translated comprises:

causing the first unit of translatable text to be translated into first target-language text with a machine translation application; and causing the first unit of translatable text to be translated into second target-language text with a translation memory application.

12. The non-transitory computer-readable storage medium of claim 11, further comprising instructions that, when executed by one or more processors, configure the one or more processors to perform the step of ranking a translation quality of the first target-language text and the second target-language text.

13. The non-transitory computer-readable storage medium of claim 12, wherein ranking the translation quality of the first target-language text and the second target-language text comprises:

determining a first translation quality of the first target-language text based on one or more heuristic parameters associated with the unit of translatable text;

determining a second translation quality of the second target-language text based on the one or more heuristic parameters; and based on the first translation quality and the second translation quality, selecting one of the first target-language text or the second target-language text as a highest quality translation.

14. The non-transitory computer-readable storage medium of claim 12, wherein ranking the translation quality of the first target-language text and the second target-language text comprises:

determining a first translation quality of the first target-language text with a machine-learning model;

determining a second translation quality of the second target-language text with the machine-learning model; and based on the first translation quality and the second translation quality, selecting one of the first target-language text and the second target-language text as a highest quality translation.

15. The non-transitory computer-readable storage medium of claim 10, further comprising instructions that, when executed by one or more processors, generating a second unit of translatable text by separating a third textual string included in a third source-language subtitle event included in the sequence of source-language subtitle events into multiple units of translatable text.

16. A system, comprising:
a memory that stores instructions; and
a processor that is coupled to the memory and, when executing the instructions, is configured to:

receive a sequence of source-language subtitle events associated with a content item, wherein each source-language subtitle event includes a different textual string representing a corresponding portion of the content item;

generate a first unit of translatable text by combining a first textual string included in a first source-language subtitle event included in the sequence of source-language subtitle events and a second textual string included in a second source-language subtitle event included in the sequence of source-language subtitle events, wherein the second source-language subtitle event is different from the first source-language subtitle event;

translate, via software, the first unit of translatable text into target-language text;

generate, based on the target-language text, at least one target-language subtitle event associated with a portion of the content item corresponding to the first source-language subtitle event and the second source-language subtitle event; and generate, for display, a subtitle presentation template that includes the at least one target-language subtitle event.

17. The system of claim 16, wherein the processor translates the first unit of translatable text by:

causing the first unit of translatable text to be translated into first target-language text with a machine translation application;

causing the first unit of translatable text to be translated into second target-language text with a translation memory application;

determining a first translation quality of the first target-language text with a machine-learning model;

determining a second translation quality of the second target-language text with the machine-learning model; and based on the first translation quality and the second translation quality, selecting one of the first target-language text and the second target-language text as a highest quality translation.

18. The system of claim 16, wherein the subtitle presentation template temporally arranges the sequence of source-language subtitle events with respect to a series of time codes that each indicate a specific playback time in the content item.

* * * * *